UNITED STATES PATENT OFFICE.

LYDIA McCLATCHEY, OF LEAMINGTON, CANADA.

PROCESS OF MAKING FLOUR FROM PUMPKINS, &c.

SPECIFICATION forming part of Letters Patent No. 617,423, dated January 10, 1899.

Application filed March 26, 1898. Serial No. 675,299. (No specimens.)

*To all whom it may concern:*

Be it known that I, LYDIA MCCLATCHEY, a citizen of the Dominion of Canada, residing at Leamington, in the Province of Ontario and Dominion of Canada, have invented new and useful Improvements in Processes of Making Vegetable Flour, of which the following is a specification.

My invention consists in a peculiar process of making pumpkin-flour whereby the pumpkin when reduced to flour is possessed of its full natural flavor and is rendered sweeter than when in its natural state.

In carrying out my process after the pumpkin is thoroughly washed and all but the solid part removed such solid part is cut into pieces weighing about one pound each, which are afterward reduced to very thin slices. These slices are dried very quickly in an evaporator, about from four to six hours being required for the operation. Such quick drying of the slices of pumpkin forms an important step of my process, because by reason of it all of the natural flavor of the pumpkin is retained and the same is rendered sweeter than when in its natural state. After the drying of the slices of pumpkin is completed the same are removed from the evaporator and are placed in a well-ventilated room or other suitable place, where they are permitted to sweat. After about twelve hours the slices of pumpkin will be quite as damp as they were before undergoing the first drying operation. This sweating of the pumpkin is effected in order to prevent sweating and consequent deterioration of the pumpkin subsequent to the grinding thereof, and it must take place in a well-ventilated room or in an open place, as otherwise the pumpkin would become sour, and consequently unfit for use. After the pumpkin slices become thoroughly damp, which requires about twelve hours, they are turned every day until they are again dry, this being done to accelerate the drying and also to present rotting or other deterioration of the pumpkin. When the slices are dry, they are placed in a suitable kiln and are left therein for about two months, with the result that when removed they are entirely free from moisture. The slices are then put through a grinding-mill about three times, and the flour thus produced is ready for use. Such flour when placed in packages or other receptacles will last for an indefinite period of time without deterioration, and when combined with milk, eggs, sugar, and spices in proper proportions will make pumpkin pies equally as good if not better than those made in the usual manner of stewed pumpkin.

While designed more especially for making pumpkin-flour, my improved process may be used to advantage in the manufacture of similar vegetables, such as squashes and the like.

I am well aware that it is old to make flour from pumpkins, squashes, sweet potatoes, and the like by cutting the same into small pieces, drying the pieces by solar or by steam or other artificial heat, and finally grinding the pieces. I therefore make no claim to such process; but What I desire to secure by Letters Patent is—

The herein-described process of making vegetable flour which consists in cutting the solid portion of the vegetable into pieces, then quickly drying the pieces by evaporation whereby all of the natural flavor of the vegetable is retained and the same is rendered sweeter than when in its natural state, then placing the pieces under conditions which will cause them to sweat and subsequently slowly dry, then kiln-drying the pieces, and finally grinding the same, all as specified.

In testimony whereof I have hereunto set my hand in presence of two subscribing witnesses.

LYDIA McCLATCHEY.

Witnesses:
 CLARA G. MALOTT,
 JOSEPHINE NICHOL.